United States Patent [19]

Weber-Unger

[11] 4,330,890
[45] May 25, 1982

[54] GARMENT IN PARTICULAR A BODICE OR SWIMSUIT

[76] Inventor: Georg E. H. Weber-Unger, Am Brand 2, Nubdorf/Inn, Fed. Rep. of Germany, 8201

[21] Appl. No.: 123,478

[22] Filed: Feb. 21, 1980

[30] Foreign Application Priority Data

Feb. 27, 1979 [DE] Fed. Rep. of Germany ....... 2907681
Apr. 12, 1979 [DE] Fed. Rep. of Germany ....... 2915702

[51] Int. Cl.³ .............................................. A41F 19/00
[52] U.S. Cl. ...................................................... 2/336
[58] Field of Search ................... 2/336, 258, 261, 326

[56] References Cited

U.S. PATENT DOCUMENTS 501,272 7/1893 Gutmann ................................ 2/326
2,505,242 4/1950 Herbener ............................... 2/336

*Primary Examiner*—Doris L. Troutman
*Attorney, Agent, or Firm*—Parmelee, Johnson, Bollinger & Bramblett

[57] ABSTRACT

In a garment, and in particular especially in a bodice or swimsuit, eyelets (2), especially adjuster slides, are used for joining parts (1) of the garment to a tape or band (9), at least one portion (5) of the eyelets (2) being sewn in each case into a loop of the part of cloth (1) or of the tape or band (9). To increase the stability of the shape of the loop enclosing the eyelets-portion (5), a fixing tab (7) is joined to the portion (5) and sewn into the loop.

14 Claims, 9 Drawing Figures

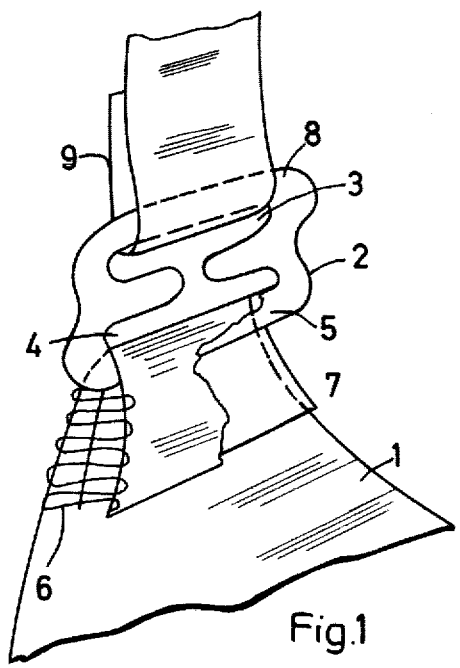
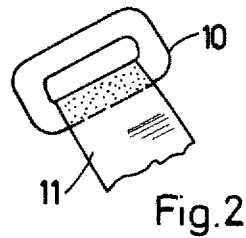
Fig.2
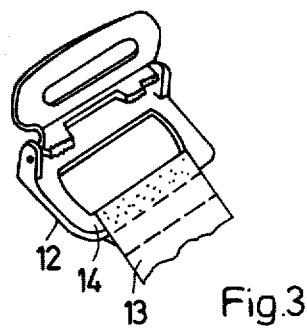
Fig.3
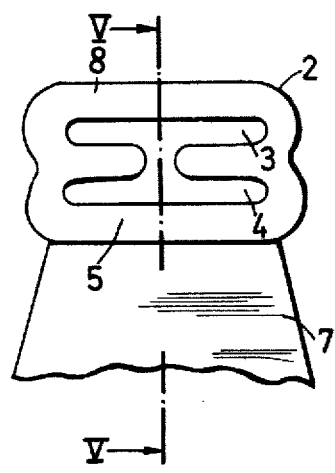
Fig.4
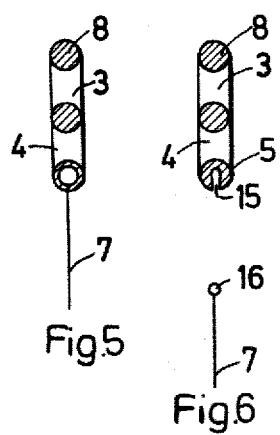
Fig.5
Fig.6

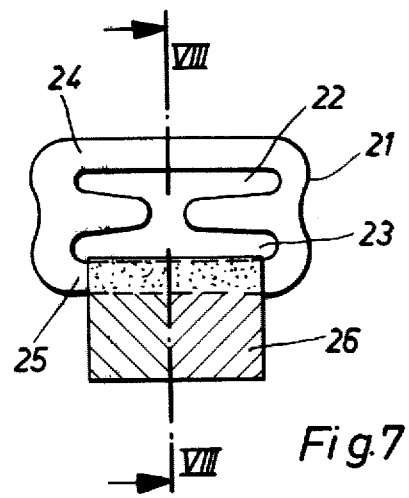
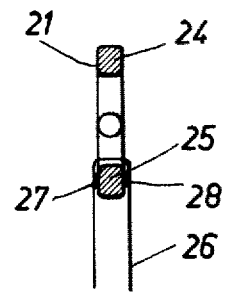
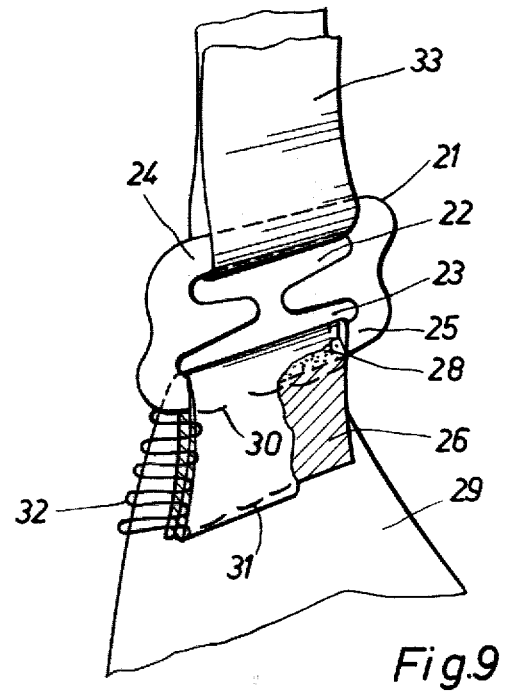

GARMENT IN PARTICULAR A BODICE OR SWIMSUIT

The invention relates to a garment, in particular a bodice or swimsuit, in which at least one part of the cloth is joined via an eyelet, especially adjuster slide having at least one longitudinal slot to a tape or band, in particular a tape or band of a strap, at least one portion of the eyelet being sewn in each case into a loop of the part of cloth, or of the tape or the band.

The fact that joining pieces formed by eyelets especially adjuster slides always tend to take up an oblique position in garments has for a long time been felt as an inconvenience, in particular in bodices, because the connected parts guided in the longitudinal slots always slide to one end of the slot. As a result, the connected parts or tapes and straps become not only unsightly but, in the region of one of the bends of the particular longitudinal slot, pressure phenomena also occur which make the particular bodice less comfortable to wear because skin irritations frequently appear in the zones subject to the pressure.

It is the object of the invention to eliminate the stated disadvantage once and for all and thus to meet a demand which has existed for a long time. According to the invention, this object is achieved when, in a garment of the type under consideration, the said portion of the eyelet is provided with at least one fixing tab and the latter is sewn into the loop.

Garments according to the invention have the advantage that the fixing tab forms an anchorage of the eyelet on the particular part of cloth or the like, which anchorage prevents tilting or an oblique position of the eyelet. In other words, the eyelet is "rooted" when it is sewn in.

It proves to be a particular advantage when the eyelet and the fixing tab consist of a weldable material and are joined to one another by welding. A solution of this type can particularly readily be put into practice in production engineering.

In the following text, the invention is explained in more detail by reference to the attached drawings in which:

FIG. 1 shows a part view of a garment with a double eyelet and a single-ply fixing tab;

FIG. 2 shows a single eyelet provided with a fixing tab;

FIG. 3 shows a single eyelet with a tilting adjuster and a fixing tab welded on;

FIG. 4 shows a plan view of the double eyelet according to FIG. 1;

FIG. 5 shows a section along the line V—V in FIG. 4;

FIG. 6 shows a section, corresponding to FIG. 5, before the fixing tab is assembled with and welded to the eyelet;

FIG. 7 shows the plan view of a double adjuster slide with a two-ply fixing tab;

FIG. 8 shows a section along the line VIII—VIII in FIG. 7 and

FIG. 9 shows the part view of a garment with the double adjuster slide according to FIGS. 7 and 8.

In FIG. 1, 1 is a part of cloth which, for example, is formed by the upper end of the upper part of the cup of a brassiere. An eyelet 2 which is formed as a double adjuster slide with two longitudinal slots 3 and 4 is joined to the part of cloth. As indicated by a thread 6, the lower portion 5 of the adjuster slide is sewn into a loop formed by the free folded-over end of the part of cloth 1. To prevent sliding of the loop in the longitudinal slot 4, a fixing tab 7 is joined to portion 5, in particular preferably by welding. The fixing tab 7 is also sewn into the loop and forms an anchorage which prevents the adjuster slide from tilting and prevents the loop from sliding in the longitudinal slot 4.

The band 9 of a strap is looped around a bar 8 of the eyelet 2. Of course, it is also possible to provide the bar 8 with a fixing tab 7, if it is unimportant whether the strap can pass freely through the longitudinal slot 3.

FIG 2 shows an eyelet 10 to which a fixing tab 11 is welded. FIG. 3 represents an adjuster slide 12 having a tilting adjuster. A fixing tab 13 is also welded to this adjuster slide. In this illustrative embodiment, the end of the fixing tab 13 loops around portion 14, and the welding zone extends a little from the portion into the fixing tab region.

FIGS. 4–6 show the construction of the eyelet according to FIG. 1. As can be seen in particular from FIG. 6, portion 5 forming a bar is provided with a holding slot 15, the end of which is widened like a recess. A detent strip 16 which is rigidly joined to the end of the fixing tab 7 engages in the recess of the holding slot 15. After the detent strip has been fitted into the holding slot 15, the fixing tab 7 and the bar 5 are welded to one another.

In principle, it is of course possible to replace the welded joint by an adhesive joint. The latter, however, is inferior to the welded joint both in respect of ease of manufacture and in respect of durability.

In FIG. 7, 21 is again an eyelet with two longitudinal slots 22 and 23 which are delimited on the outside by portions 24 and 25. A fixing tab 26 which consists of a section of cotton tape with a twill weave and closed selvedges is looped around portion 25 forming a bar. On the mutually opposite sides 27 and 28 of the bar the fixing tab 26 is joined to the bar. For making the joint, ultrasonics or an ultrasonic welding apparatus is used. Portion 25 which preferably consists of an acetal resin, that is to say a material having a high mechanical loss factor, is partially softened with the aid of ultrasonics. The fixing tab 26 is pressed into the softened zone so that the bar material can penetrate into the pores of the fabric of the tab. After the ultrasonic action has ceased, the material solidifies, and a durable anchorage between portion 25 and the fixing tab 26 is formed. Since the fixing tab 26 loops around portion 25 in the shape of a U, as can be seen in particular from FIG. 8, the joint surfaces do not have to absorb any forces acting on the fixing tab 26 in a downward direction in FIG. 8.

In FIG. 9, a part of a garment is shown which is fitted with an eyelet 21 shown in FIGS. 7 and 8. As can be seen, the eyelet 21 is sewn into a part of cloth 29, in particular by means of transverse seams 30 and 31 and longitudinal seams, of which the left-hand longitudinal seam 32 has been indicated. The upper portion 24 of the eyelet 21 is looped by a band 33 of a strap which may be adjustable. If adjustability of the strap is dispensed with, it is of course also possible to provide portion 24 with a fixing tab.

The fixing tab 26 and its shape and arrangement in this case also prevent the eyelet 21 from sliding in the connecting loop formed by the part of cloth 29 and from taking up an oblique position in the strap.

Buckles and so-called adjusters are also to be understood as an eyelet in the sense of the invention, whilst the term parts of cloth also comprises parts consisting of plastic film and mixed rubber fabric.

I claim:

1. In a garment, in particular a bodice or swimsuit, in which at least one part of the cloth of the garment is joined via an eyelet, particularly an adjuster slide having at least one longitudinal slot, to a tape or band, in particular a tape or band of a strap, at least one portion of the eyelet being sewn in each case into a loop of the part of the cloth, or the tape, or the band, the improvement comprising:

at least one fixing tab (7; 11; 13; 26) joined to said at least one portion (5; 14; 25) of said eyelet, said fixing tab being sewn into said loop and forming an anchorage preventing tilting or oblique positioning of said eyelet relative to said loop.

2. Garment according to claim 1, characterized in that the eyelet (2;10;12) and the fixing tab (7;11;13) include a weldable material and are joined to one another by welding.

3. Garment according to claim 1, characterized in that the portion (25) of the eyelet joined to the fixing tab (26) includes a material which can be softened by means of ultrasonics and the fixing tab (26) includes a fabric having pores, in the pores of which softened and subsequently solidified bar material is anchored.

4. Garment according to claim 3, characterized in that the portion (25) includes an acetal resin.

5. Garment according to claim 3 or 4, characterized in that the fixing tab (26) is formed from a section of cotton tape.

6. Garment according to claim 5, characterized in that the section of cotton tape has a twill weave.

7. Garment according to claim 1, characterized in that one end of the fixing tab (13;26) firmly encloses its associate portion (14;25) of the eyelet.

8. Garment according to claim 7, characterized in that the fixing tab (26) is laid around a bar (25) of the eyelet and is joined to the latter on mutually opposite sides (27,28) of the bar (25).

9. Garment according to claim 1, characterized in that the fixing tab (26) has closed selvedges.

10. Garment according to claim 1, characterized in that the eyelet (10) is formed as a single eyelet.

11. Garment according to claim 1, characterized in that the eyelet (2;21) is formed as a double eyelet.

12. Garment according to claim 1, characterized in that the eyelet (12) is formed as a single adjuster slide with a tilting adjuster.

13. Garment according to claim 1 or 2, characterized in that the sewn-in portion of the eyelet is provided with a holding slot (15) for one end of the fixing tab (7).

14. Garment according to claim 13, characterized in that the end of the fixing tab (7), introduced into the holding slot (15), is provided with a detent strip (16) which engages in the recesses of the holding slot (15).

* * * * *